United States Patent
Kano et al.

(10) Patent No.: US 10,622,164 B2
(45) Date of Patent: Apr. 14, 2020

(54) ELECTROCHEMICAL DEVICE

(71) Applicant: TAIYO YUDEN CO., LTD., Chuo-ku, Tokyo (JP)

(72) Inventors: Koji Kano, Takasaki (JP); Tomoya Iwazaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 33 days.

(21) Appl. No.: 15/740,319

(22) PCT Filed: Mar. 30, 2016

(86) PCT No.: PCT/JP2016/060299
§ 371 (c)(1),
(2) Date: Dec. 27, 2017

(87) PCT Pub. No.: WO2017/010129
PCT Pub. Date: Jan. 19, 2017

(65) Prior Publication Data
US 2018/0174765 A1    Jun. 21, 2018

(30) Foreign Application Priority Data
Jul. 10, 2015   (JP) .................. 2015-138688

(51) Int. Cl.
*H01G 11/50*   (2013.01)
*H01G 11/06*   (2013.01)
(Continued)

(52) U.S. Cl.
CPC ............. *H01G 11/50* (2013.01); *H01G 11/06* (2013.01); *H01G 11/14* (2013.01); *H01G 11/66* (2013.01);
(Continued)

(58) Field of Classification Search
CPC ........ H01G 11/06; H01G 11/50; H01G 11/58; H01G 11/84
See application file for complete search history.

(56) References Cited

U.S. PATENT DOCUMENTS

2013/0208404 A1*  8/2013  Yasuda ................. H01G 11/06
361/516
2013/0286545 A1*  10/2013 Kojima ................ H01G 11/06
361/528

FOREIGN PATENT DOCUMENTS

CN        1770545 A     5/2006
CN      102082288 A     6/2011
(Continued)

OTHER PUBLICATIONS

A First Office Action issued by the State Intellectual Property Office of China dated Nov. 30, 2018 for Chinese counterpart application No. 201680039468.9. (7 pages).
(Continued)

*Primary Examiner* — Eric W Thomas
(74) *Attorney, Agent, or Firm* — Law Office of Katsuhiro Arai

(57) ABSTRACT

An electrochemical device includes: a positive electrode having a positive-electrode collector made of conductive material, and a positive-electrode active material layer formed on the positive-electrode collector; a negative electrode having a negative-electrode collector made of conductive material, and a negative-electrode active material layer formed on the negative-electrode collector; separators placed between the positive electrode and the negative electrode; and an electrolyte immersing the positive electrode, negative electrode, and separators. Metallic lithium is joined to a lithium-electrode collector, and the lithium-electrode collector is placed in a manner contacting the negative-electrode active material layer, and immersed in
(Continued)

the electrolyte, so that the negative-electrode active material is pre-doped with lithium ions. The electrochemical device can offer high capacitance and excellent productivity.

6 Claims, 6 Drawing Sheets

(51) Int. Cl.
    *H01G 11/66*     (2013.01)
    *H01G 11/14*     (2013.01)
    *H01G 11/38*     (2013.01)
    *H01G 11/86*     (2013.01)

(52) U.S. Cl.
    CPC .............. *H01G 11/38* (2013.01); *H01G 11/86* (2013.01); *Y02E 60/13* (2013.01)

(56) References Cited

FOREIGN PATENT DOCUMENTS

| CN | 104380503 A | 2/2015 |
|----|-------------|--------|
| JP | 2007305521 A | 11/2007 |
| JP | 2008097991 A | 4/2008 |
| JP | 2008123826 A | 5/2008 |
| JP | 2010186784 A | 8/2010 |
| JP | 2015070032 A | 4/2015 |
| JP | 2015088605 A | 5/2015 |

OTHER PUBLICATIONS

International Search Report (ISR) dated May 24, 2016, issued for International application No. PCT/JP2016/060299.
International Preliminary Report on Patentability (PCT/IB/373) and Written Opinion of the International Searching Authority (PCT/ISA/237) dated Jan. 16, 2018, for corresponding international application PCT/JP2016/060299.
A Notification of Reasons for Refusal issued by the Japanese Patent Office, dated Jan. 22, 2020, for Japanese counterpart application No. 2017-528299. (3 pages).

\* cited by examiner

[FIG. 1]
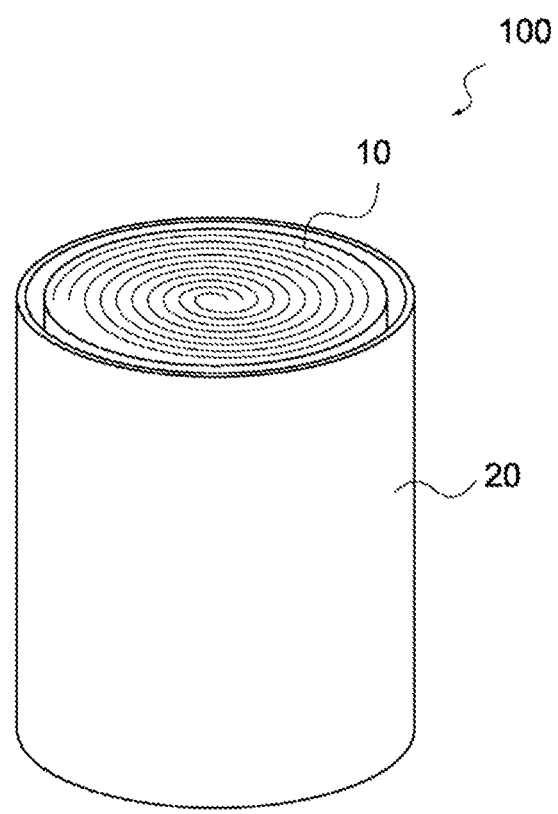

[FIG. 2]
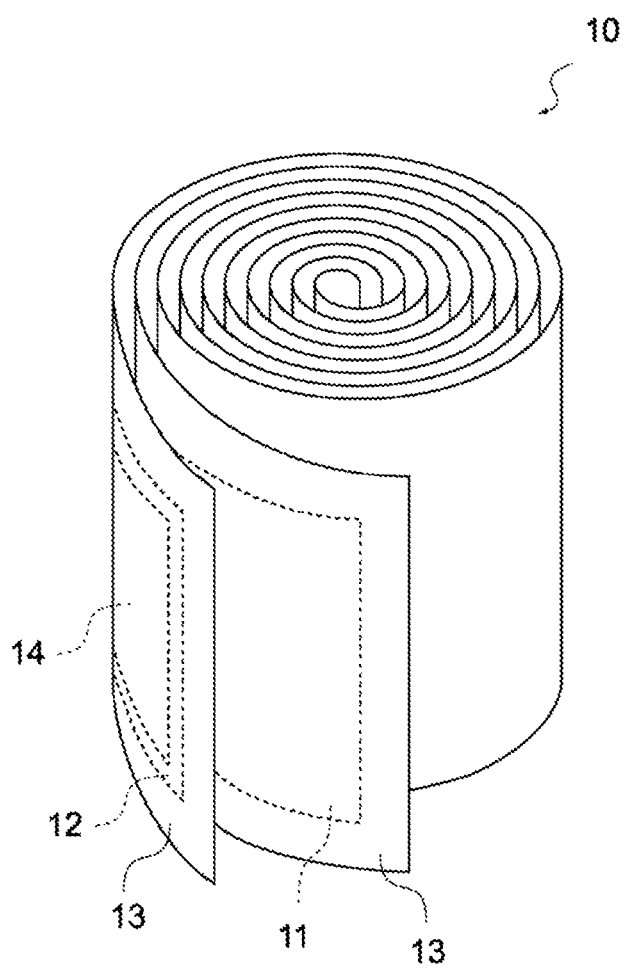

[FIG. 3]
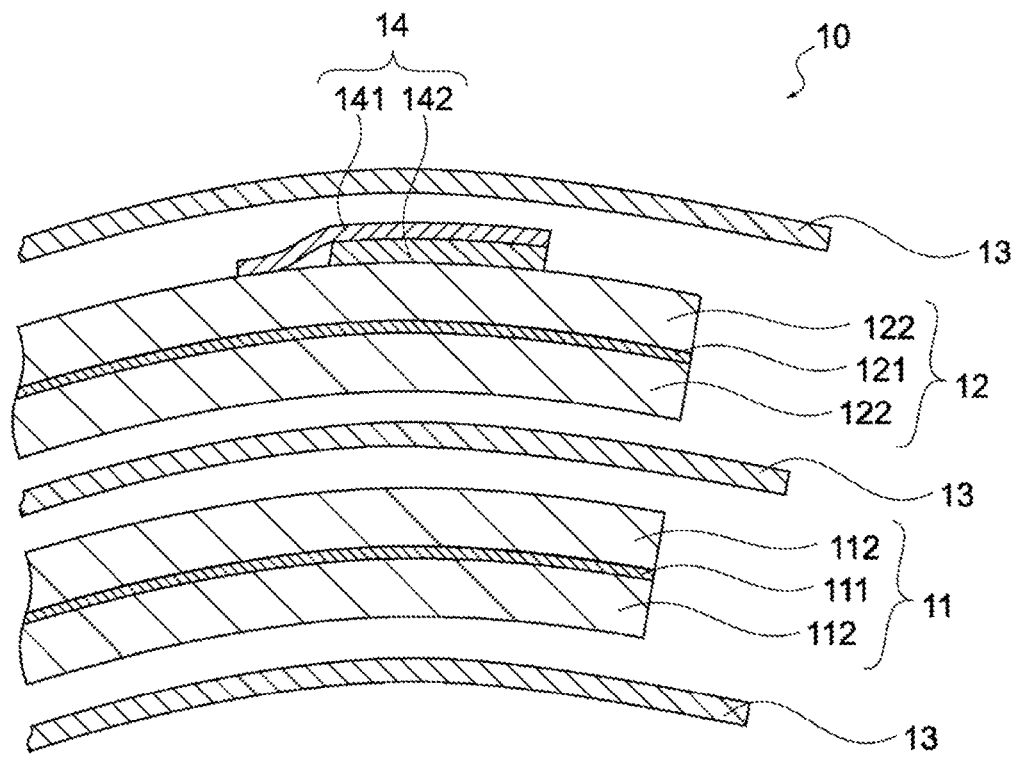
[FIG. 4]
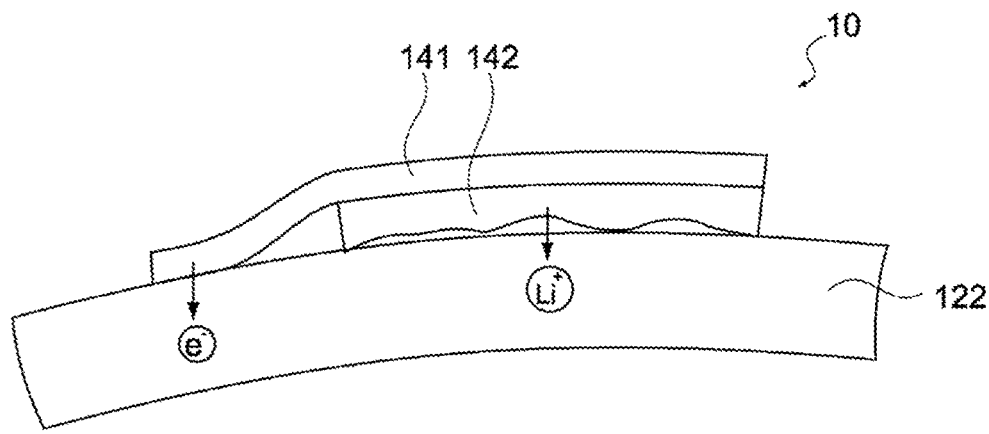

[FIG. 5]
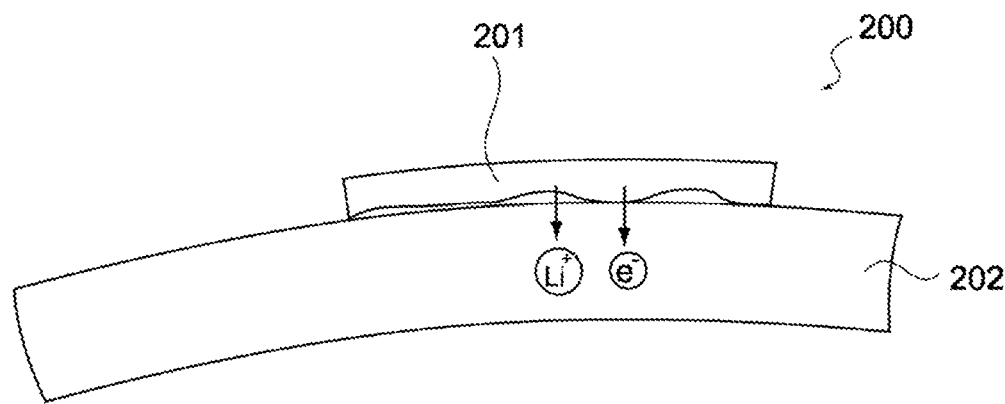
[FIG. 6]
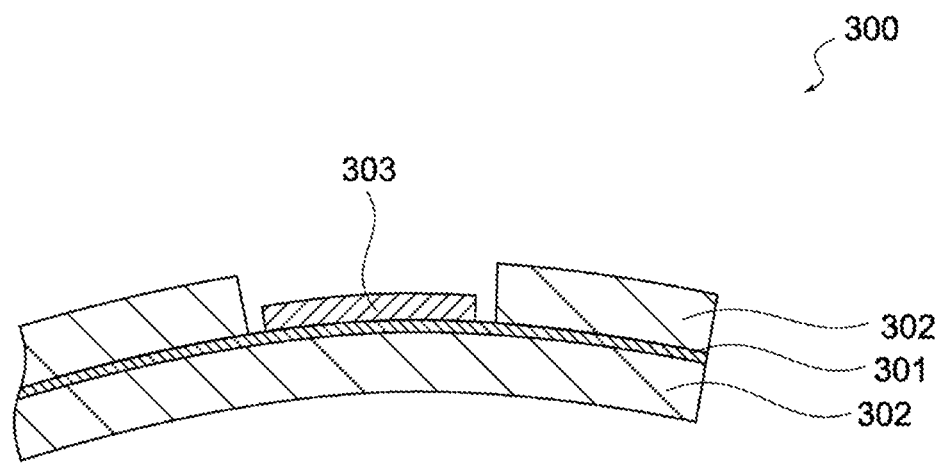

[FIG. 7]
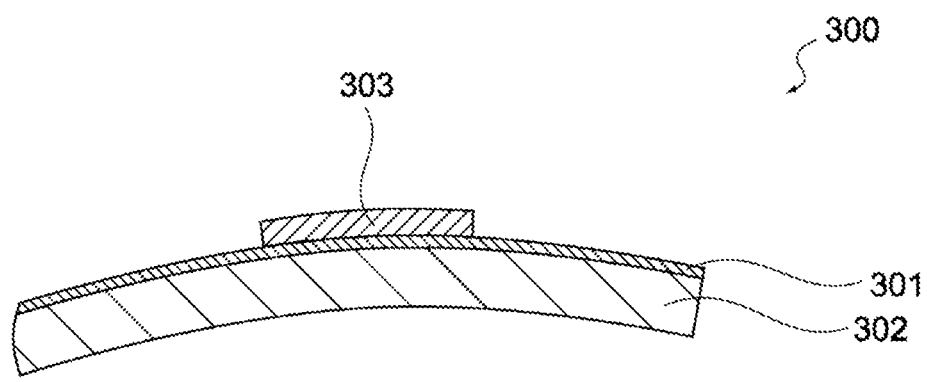
[FIG. 8]
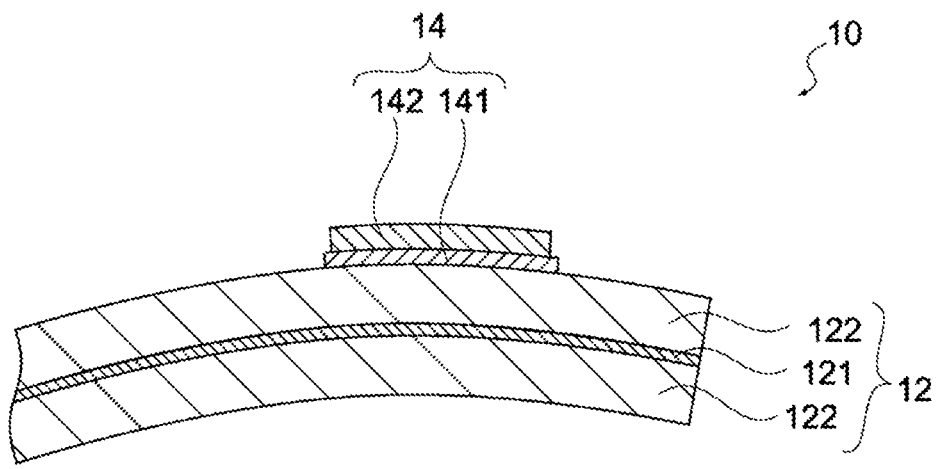

[FIG. 9]
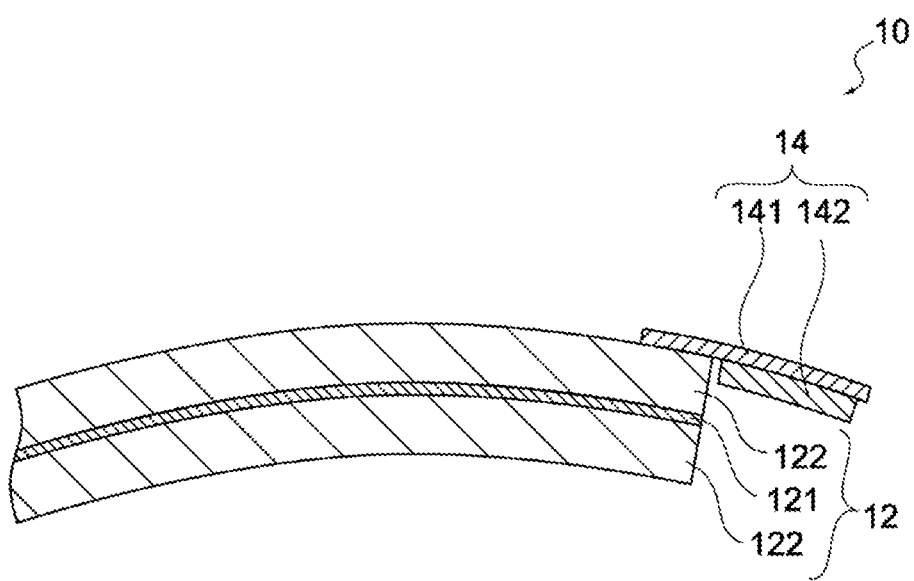

ELECTROCHEMICAL DEVICE

This application is the U.S. National Phase under 35 U.S.C. § 371 of International Application PCT/JP2016/060299, filed Mar. 30, 2016, which claims priority to Japanese Patent Application No. 2015-138688, filed Jul. 10, 2015. The International Application was published under PCT Article 21(2) in a language other than English.

TECHNICAL FIELD

The present invention relates to an electrochemical device using lithium ion pre-doping.

BACKGROUND ART

High-capacitance, long-service life capacitors are required of late. Electric double-layer capacitors offer very high output, but their energy density is low; on the other hand, batteries offer high energy density but their output is low. In more applications, batteries are being replaced by lithium ion capacitors using lithium-occludable material for the negative electrode, because lithium ion capacitors offer higher energy density than electric double-layer capacitors and longer service life than batteries.

On the other hand, lithium ion capacitors require the so-called "pre-doping" step where lithium ions are doped into the negative electrode, which leads to low productivity. In the manufacturing process for lithium ion capacitors described in Patent Literature 1, for example, the electrodes must be cut so that lithium can be placed in the device, after which the lithium must be connected by welding.

Also, Patent Literature 2 discloses a lithium ion electric storage element constituted by a negative-electrode collector on which an active material layer is stacked, wherein a region where the active material layer is not stacked is formed on the negative-electrode collector, and lithium is placed in this region for pre-doping.

BACKGROUND ART LITERATURE

Patent Literature

Patent Literature 1: Japanese Patent Laid-open No. 2010-186784
Patent Literature 2: Japanese Patent Laid-open No. 2007-305521

SUMMARY OF THE INVENTION

Problems to be Solved by the Invention

One method to place a lithium source in an electrochemical device requiring lithium ion pre-doping as described above is to attach lithium onto a lithium collector and then connect the lithium collector to the negative-electrode collector. However, this method requires that a lithium collector be prepared separately, and it also requires a step to connect the lithium collector to the negative-electrode collector.

Another method is to attach lithium directly onto the negative-electrode collector. However, this requires that a region where negative-electrode active material is not applied be formed on a part of the negative-electrode collector, which requires a higher level of art compared to when negative-electrode active material is applied over the entire surface. It is also possible to apply negative-electrode active material on the front side of the negative-electrode collector only, and attach lithium on the back side; in this case, however, the storage capacitance decreases compared to when negative-electrode active material is applied on both sides.

In light of the aforementioned situations, an object of the present invention is to provide an electrochemical device offering high capacitance and excellent productivity.

Means for Solving the Problems

To achieve the aforementioned object, the electrochemical device pertaining to an embodiment of the present invention has: a positive electrode having a positive-electrode collector made of conductive material, and a positive-electrode active material layer formed on the positive-electrode collector; a negative electrode having a negative-electrode collector made of conductive material, and a negative-electrode active material layer formed on the negative-electrode collector; separators placed between the positive electrode and the negative electrode; and an electrolyte immersing the positive electrode, negative electrode, and separators; wherein metallic lithium is joined to a lithium-electrode collector, and the lithium-electrode collector is placed in a manner contacting the negative-electrode active material layer, and immersed in the electrolyte, so that the negative-electrode active material is pre-doped with lithium ions.

According to this constitution, even when oxidative dissolution of the metallic lithium progresses, and the metallic lithium no longer contacts the negative-electrode active material layer, electrons generating from oxidative dissolution of the metallic lithium flow to the negative-electrode active material layer via the lithium-electrode collector, and oxidative dissolution of the metallic lithium continues. The lithium electrode need only be placed in a manner allowing the lithium-electrode collector to contact the negative-electrode active material layer and there is no need to weld it to the negative-electrode collector, etc., which results in excellent productivity.

The lithium-electrode collector and the metallic lithium may be joined together by means of pressure-bonding.

According to this constitution, the lithium-electrode collector can be joined with the metallic lithium with ease, and the metallic lithium melts properly.

The negative-electrode collector is foil-shaped and has a front side and a back side, and the negative-electrode active material layer may be formed on the front side and the back side.

According to this constitution, the capacitance of the electric storage element can be improved compared to when the negative-electrode active material layer is formed only on either the front side or the back side.

The lithium-electrode collector may be made of a metal having an oxidation-reduction potential of 2.5 V or higher relative to the metallic lithium.

According to this constitution, oxidative dissolution of the lithium-electrode collector can be prevented, even when the negative electrode potential increases due to design variation, etc.

The lithium-electrode collector may be constituted by copper.

Copper is strong even in thin form and is also very flexible, so it is a preferred material for the lithium-electrode collector. Pressure-bonding copper and metallic lithium prevents the metallic lithium from dissolving from the pressure-bonded interface side caused by entry of the electrolyte into the interface, thereby maintaining conductivity between the lithium-electrode collector and the metallic lithium, allowing the metallic lithium to properly dissolve.

The positive electrode and negative electrode may be stacked and wound together with the separators in between.

A wound-type electrochemical device whose positive electrode and negative electrode are stacked and wound together with separators in between, has a smaller spatial margin, and thus presents difficulty in placing the lithium electrode, compared to a stacked-type electrochemical device whose positive electrode and negative electrode are stacked together with separators in between; however, the lithium electrode can be placed favorably according to the present invention.

Effects of the Invention

According to the present invention, an electrochemical device offering high capacitance and excellent productivity can be provided, as described above.

BRIEF DESCRIPTION OF THE DRAWINGS

FIG. 1 Perspective view of an electrochemical device pertaining to an embodiment of the present invention.

FIG. 2 Perspective view of the electric storage element provided in the electrochemical device.

FIG. 3 Cross-sectional view of the electric storage element provided in the electrochemical device.

FIG. 4 Schematic view showing oxidative dissolution of metallic lithium in the electrochemical device.

FIG. 5 Schematic view showing oxidative dissolution of metallic lithium in the electrochemical device pertaining to a comparative example.

FIG. 6 Cross-sectional view of the electric storage element provided in the electrochemical device pertaining to a comparative example.

FIG. 7 Cross-sectional view of the electric storage element provided in the electrochemical device pertaining to a comparative example.

FIG. 8 Cross-sectional view of a partial constitution of the electrochemical device pertaining to a variation example of the present invention.

FIG. 9 Cross-sectional view of a partial constitution of the electrochemical device pertaining to a variation example of the present invention.

MODE FOR CARRYING OUT THE INVENTION

The electrochemical device pertaining to the first embodiment of the present invention is explained.

[Constitution of Electrochemical Device]

FIG. 1 is a perspective view of an electrochemical device 100 pertaining to this embodiment. As shown in this figure, the electrochemical device 100 is constituted by an electric storage element 10 housed in a container 20. Also, an electrolyte is housed in the container 20 together with the electric storage element 10. It should be noted that, in this figure, lids sealing the top face and bottom face of the container 20 are not illustrated.

FIG. 2 is a perspective view of the electric storage element 10. As shown in this figure, the electric storage element 10 has a positive electrode 11, a negative electrode 12, a separator 13, and a lithium electrode 14. The electric storage element 10 comprises the positive electrode 11 and negative electrode 12 that are stacked and wound together with the separators 13 in between. FIG. 3 is a cross-sectional view near a wound end of the electric storage element 10.

The positive electrode 11 has a positive-electrode collector 111 and positive-electrode active material layers 112. The positive-electrode collector 111 is made of conductive material, and may be an aluminum foil or other metal foil. The positive-electrode collector 111 may be a metal foil whose surface has been chemically or mechanically roughened, or a metal foil in which through holes have been formed. It should be noted that the positive-electrode collector 111 may have a terminal (not illustrated) connected to it and led out of the container 20.

The positive-electrode active material layer 112 is formed on the positive-electrode collector 111. The material for positive-electrode active material layer may be a mixture of positive-electrode active material and binder resin, and may further contain conductive auxiliary agent. For the positive-electrode active material, any material to which the lithium ions and anions in the electrolyte can adsorb, such as active carbon, polyacene carbide, etc., may be used.

For the binder resin, any synthetic resin that joins the positive-electrode active material, such as styrene butadiene rubber, polyethylene, polypropylene, polyethylene terephthalate, aromatic polyamide, carboxy methyl cellulose, fluororubber, polyvinylidene fluoride, isoprene rubber, butadiene rubber, ethylene propylene rubber, etc., may be used.

The conductive auxiliary agent comprises grains made of conductive material, and improves the conductivity with the positive-electrode active material. The conductive auxiliary agent may be graphite, carbon black, or other carbon material, for example. Any of the foregoing may be used alone, or two or more of them may be mixed together. It should be noted that the conductive auxiliary agent can also be a metal material or conductive polymer, etc., so long as it has conductivity.

The positive-electrode active material layer 112 may be formed by applying a material in paste form on the positive-electrode collector 111 and then drying or curing the material. As shown in FIG. 3, the positive-electrode active material layer 112 may be formed on both the front and back sides of the positive-electrode collector 111.

The negative electrode 12 has a negative-electrode collector 121 and negative-electrode active material layers 122. The negative-electrode collector 121 is made of conductive material, and may be a copper foil or other metal foil. The negative-electrode collector 121 may be a metal foil whose surface has been chemically or mechanically roughened, or a metal foil in which through holes have been formed. It should be noted that the negative-electrode collector 121 may have a terminal (not illustrated) connected to it and led out of the container 20.

The negative-electrode active material layer 122 is formed on the negative-electrode collector 121. The material for negative-electrode active material layer may be a mixture of negative-electrode active material and binder resin, and may further contain conductive auxiliary agent.

For the negative-electrode active material, any material to which the lithium ions in the electrolyte can adsorb, such as hard carbon, graphite, soft carbon, or other carbon material, may be used.

For the binder resin, any synthetic resin that joins the negative-electrode active material, such as styrene butadiene rubber, polyethylene, polypropylene, polyethylene terephthalate, aromatic polyamide, carboxy methyl cellulose, fluororubber, polyvinylidene fluoride, isoprene rubber, butadiene rubber, ethylene propylene rubber, etc., may be used.

The conductive auxiliary agent comprises grains made of conductive material, and improves the conductivity with the negative-electrode active material. The conductive auxiliary agent may be graphite, carbon black, or other carbon material, for example. Any of the foregoing may be used alone, or two or more of them may be mixed together. It should be noted that the conductive auxiliary agent can also be a metal material or conductive polymer, etc., so long as it has conductivity.

The negative-electrode active material layer 122 may be formed by applying a material in paste form on the negative-electrode collector 121 and then drying or curing the material. As shown in FIG. 3, the negative-electrode active material layer 122 may be formed on both the front and back sides of the negative-electrode collector 121.

The separators 13 insulate the positive electrode 11 and the negative electrode 12 and let the ions contained in the electrolyte pass through them. To be specific, the separators 13 may each be paper, woven fabric, non-woven fabric, synthetic resin microporous film, etc.

The lithium electrode 14 includes a lithium-electrode collector 141 and a metallic lithium 142. The lithium-electrode collector 141 may be made of metal. As a metal that can be used for the lithium-electrode collector 141, one having an oxidation-reduction potential of 2.5 V or higher relative to the metallic lithium is preferred. To be specific, the lithium-electrode collector 141 may be made of copper, iron, nickel, tin, silver, platinum, gold, or an alloy of two or more of the foregoing. Among these, copper is preferred as it is strong even in thin form, and is also very flexible.

The lithium-electrode collector 141 may be shaped like foil. Also, the lithium-electrode collector 141 need not be foil-shaped, and it may be linear or mesh-shaped, for example. As shown in FIG. 3, the lithium-electrode collector 141 contacts the negative-electrode active material layer 122 at least partially.

The metallic lithium 142 is joined to the lithium-electrode collector 141. The metallic lithium 142 may be pressure-bonded to the lithium-electrode collector 141. Also, the metallic lithium 142 may be joined to the lithium-electrode collector 141 by means of welding. The shape of the metallic lithium 142 is not limited in any way, but preferably it is foil-shaped so as to reduce the thickness of the electric storage element 10. The metallic lithium 142 may be in a quantity just sufficient to allow it to be doped into the negative-electrode active material layer 122 in the lithium ion pre-doping as described later.

The electric storage element 10 has the aforementioned constitution. The electric storage element 10 may be produced as follows. First, a separator 13, positive electrode 11, separator 13, and negative electrode 12 are stacked in this order and wound together, to produce a wound body. Then, a lithium electrode 14 is placed on the negative electrode 12 on the outer periphery of the wound body, the outer periphery of the wound body is covered with a separator 13, and this winding is fixed with an adhesive tape, etc. It should be noted that an insulating tape may be used instead of the separator 13 covering the outer periphery. The lithium electrode 14 is sandwiched between the negative electrode 12 and the separator 13, and contacts the negative-electrode active material layer 122.

The electrochemical device 100 may be produced by housing the electric storage element 10 together with the electrolyte in, and then sealing, the container 20. The type of electrolyte is not limited in any way, and in the case of a device using hard carbon for the negative electrode, $LiPF_6$-propylene carbonate solution may be used, for example.

The electrochemical device 100 is an electrochemical device requiring lithium ion pre-doping, or typically a lithium ion capacitor. Also, the electrochemical device 100 may be a lithium ion secondary battery. Lithium ion secondary batteries may be pre-doped with lithium ions in order to compensate for their irreversible capacitance.

[Effects of Electrochemical Device]

The metallic lithium 142 undergoes oxidative dissolution when the electric storage element 10 contacts the electrolyte. FIG. 4 is a schematic view showing oxidative dissolution of the metallic lithium 142. As shown in this figure, oxidative dissolution of the metallic lithium produces lithium ions ($Li^+$) and electrons ($e^-$). The lithium ions travel through the electrolyte and reach the negative-electrode active material layer 122, and are doped into the negative-electrode active material layer 122. The electrons flow through the lithium-electrode collector 141 to the negative-electrode active material layer 122.

As the metallic lithium 142 dissolves further, the metallic lithium 142 no longer contacts the negative-electrode active material layer 122. Even in this state, the electrons still flow through the lithium-electrode collector 141 to the negative-electrode active material layer 122, so the metallic lithium 142 dissolves further until the entire quantity of the metallic lithium 142 dissolves.

FIG. 5 is a schematic view showing an electric storage element 200 pertaining to a comparative example. The electric storage element 200 is constitutionally identical to the electric storage element 10, except that it has no lithium-electrode collector. As shown in this figure, a metallic lithium 201 undergoes oxidative dissolution when the electric storage element 200 contacts the electrolyte. Lithium ions ($Li^+$) generating from oxidative dissolution of the metallic lithium travel through the electrolyte and reach a negative-electrode active material layer 202, and are doped into the negative-electrode active material layer 202. Electrons ($e^-$) flow directly to the negative-electrode active material layer 202 from the metallic lithium 201.

As the metallic lithium 201 dissolves further, the metallic lithium 201 no longer contacts the negative-electrode active material layer 202, and consequently electrons no longer flow to the negative-electrode active material layer 202. As a result, the oxidative dissolution of the metallic lithium 201 stops and metallic lithium 201 remains.

As described above, the oxidative dissolution of the metallic lithium 201 is interrupted and immaturely stops in the case of the electric storage element 200 pertaining to the comparative example; with the electric storage element 10 pertaining to this embodiment, on the other hand, the oxidization reaction of the metallic lithium 142 is not interrupted and does not immaturely stop, and the entire quantity of the metallic lithium 142 can be doped into the negative-electrode active material layer 122.

In the meantime, another method to maintain electron conduction between the metallic lithium and the negative-electrode active material layer is to directly attach the metallic lithium onto the negative-electrode collector. FIGS. 6 and 7 are schematic views showing an electric storage element 300 pertaining to another comparative example. As shown in these figures, the electric storage element 300 comprises a negative-electrode collector 301, a negative-electrode active material layer 302, and a metallic lithium 303. It should be noted that, in FIGS. 6 and 7, the positive electrode and separators are not illustrated.

As shown in FIG. 6, a region where the negative-electrode active material layer 302 is not applied may be formed on the negative-electrode collector 301, and the metallic lithium 303 may be attached in this region. In this case, however, a step to form a non-application region of negative-electrode active material layer 302 is required, and it is also necessary to design different non-application regions for different types of products, which leads to poor productivity.

Also, as shown in FIG. 7, the negative-electrode active material layer 302 may be applied only on one of the front and back sides of the negative-electrode collector 301, and the metallic lithium 303 may be attached on the one side. In this case, however, the area of the negative-electrode active material layer 302 becomes a half compared to when the negative-electrode active material layer 302 is applied on both the front and back sides of the negative-electrode collector 301, and the capacitance of the electric storage element 300 decreases.

Besides the above, another method is available which is to weld the lithium-electrode collector with the metallic lithium attached on it, directly to the negative-electrode collector or negative electrode terminal; however, it requires a welding step. Compared to these structures, the electrochemical device 100 pertaining to this embodiment can achieve excellent productivity, because all that is required is to place the lithium electrode 14 on the negative-electrode collector 121 and sandwich them with the separators 13.

Variation Examples

The constitution of the electrochemical device 100 is not limited to the foregoing. FIG. 8 is a cross-sectional view of the negative electrode 12 and lithium electrode 14 of the electrochemical device 100 pertaining to a variation example. As shown in this figure, the lithium-electrode collector 141 may be placed on the negative-electrode active material layer 122, and the metallic lithium 142 may be joined onto the lithium-electrode collector 141. It should be noted that preferably the lithium-electrode collector 141 has through holes for passing lithium ions.

FIG. 9 is a cross-sectional view of the negative electrode 12 and lithium electrode 14 of the electrochemical device 100 pertaining to another variation example. As shown in this figure, the lithium-electrode collector 141 may be led out from a wound end of the negative-electrode active material layer 122, and the metallic lithium 142 may be joined onto it. The electrochemical device 100 may not be as described above, so long as it is constituted in such a way that the lithium-electrode collector 141 contacts the negative-electrode active material layer 122 and the metallic lithium 142 is joined to the lithium-electrode collector 141. Also, the electric storage element 10 need not be a wound-type; instead, it may be a stacked-type whose positive electrode and negative electrode are stacked with separators in between.

Example

An electric storage element pertaining to an example, and another pertaining to a comparative example, were produced and the remaining metallic lithium was studied.

Hard carbon, carbon black, carboxy methyl cellulose, styrene butadiene rubber, and water were mixed together, to produce a negative-electrode material paste. The negative-electrode material paste was applied on the front and back surfaces of a negative-electrode collector constituted by an aluminum foil in which through holes had been formed by etching, after which the paste was dried, to produce a negative electrode.

Active carbon, carbon black, carboxy methyl cellulose, styrene butadiene rubber, and water were mixed together, to produce a positive-electrode material paste. The positive-electrode material paste was applied on the front and back surfaces of a positive-electrode collector constituted by an aluminum foil in which through holes had been formed by etching, after which the paste was dried, to produce a positive electrode.

The positive electrode was cut to 24 mm in length, while the negative electrode was cut to 27 mm in length, with the two having an equal width, after which the separator, positive electrode, separator, and negative electrode were stacked in this order and wound together, to produce a wound body. The separators were made of paper.

Metallic lithium was attached to a copper foil, as follows. A lithium foil of 25 mm in width and 0.15 mm in thickness was placed on a copper foil of 26 mm in width, and the two were pressure-bonded by applying 50 N using a polypropylene resin roller of 30 mm in diameter, to produce a lithium electrode. The quantity of metallic lithium was set to ±2% of the required quantity, being the maximum quantity as measured electrochemically beforehand that can be occluded in the negative electrode. The lithium electrode was placed in a manner contacting the negative-electrode active material layer of the wound body, after which the lithium electrode was covered with a separator or insulating tape to insulate it from the container, and then fixed with an adhesive tape. The electric storage element pertaining to the example was thus produced.

Also, an electric storage element pertaining to the comparative example was produced. The electric storage element pertaining to the comparative example was produced in the same manner as that of the electrochemical device pertaining to the example, except that it did not have the lithium-electrode collector, after which the metallic lithium was placed on the negative-electrode active material layer.

The electric storage element pertaining to the example, and the electric storage element pertaining to the comparative example, were each immersed for one hour in an electrolyte (propylene carbonate, 1.0-mol $LiPF_6$ solution), and then transferred into a laminate and sealed. These cells were kept for 20 days in a 40° C. environment, and then disassembled and studied.

No remaining metallic lithium was found in the electric storage element pertaining to the example, meaning that the entire quantity had been pre-doped. Some of the copper foil used as the lithium-electrode collector remained near the negative-electrode active material layer, and traces of pressure-bonded metallic lithium were found on the surface of the copper foil. In the electric storage element pertaining to the comparative example, 57% of the metallic lithium remained. Based on the above, the electrochemical device pertaining to the aforementioned embodiment has a structure that can cause metallic lithium pre-doping to progress in a favorable manner.

DESCRIPTION OF THE SYMBOLS

10—Electric storage element
11—Positive electrode
12—Negative electrode
13—Separator
14—Lithium electrode
20—Container
100—Electrochemical device
111—Positive-electrode collector
112—Positive-electrode active material layer 121—Negative-electrode collector
122—Negative-electrode active material layer
141—Lithium-electrode collector
142—Metallic lithium

What is claimed is:

1. An electrochemical device comprising:
a positive electrode having a positive-electrode collector made of conductive material, and a positive-electrode active material layer formed on the positive-electrode collector;
a negative electrode having a negative-electrode collector made of conductive material, and a negative-electrode active material layer formed on the negative-electrode collector;
separators placed between the positive electrode and the negative electrode; and
an electrolyte immersing the positive electrode, the negative electrode, and the separators;
wherein the electrochemical device further comprises a lithium-electrode collector to which metallic lithium is joined, wherein the lithium-electrode collector is placed in a manner directly contacting the negative-electrode active material layer and contacting the negative-electrode collector solely via the negative-electrode active material layer, and is immersed in the electrolyte, whereby negative-electrode active material in the negative-electrode active material layer is pre-doped with lithium ions released from the metallic lithium.

2. The electrochemical device according to claim 1, wherein the lithium-electrode collector and the metallic lithium are pressure-bonded.

3. The electrochemical device according to claim 2, wherein the negative-electrode collector is foil-shaped and has a front side and a back side, and the negative-electrode active material layer is formed on the front side and the back side.

4. The electrochemical device according to claim 2, wherein the lithium-electrode collector is made of a metal having an oxidation-reduction potential of 2.5 V or higher relative to the metallic lithium.

5. The electrochemical device according to claim 2, wherein the lithium-electrode collector is made of copper.

6. The electrochemical device according to claim 1, wherein the positive electrode and negative electrode are stacked and wound together with the separators in between.

* * * * *